United States Patent
Lee

(10) Patent No.: US 12,329,323 B2
(45) Date of Patent: Jun. 17, 2025

(54) MIXER AND DEWATERING METHOD THEREOF

(71) Applicants: INTROPACK CO., LTD., Pyeongtaek-si (KR); NUC ELECTRONICS CO., LTD., Daegu (KR)

(72) Inventor: Kyul-Joo Lee, Dangjin-si (KR)

(73) Assignees: INTROPACK CO., LTD., Gyeonggi-do (KR); NUC ELECTRONICS CO., LTD., Daegu (KR)

( * ) Notice: Subject to any disclaimer, the term of this patent is extended or adjusted under 35 U.S.C. 154(b) by 739 days.

(21) Appl. No.: 17/629,515

(22) PCT Filed: Jul. 17, 2020

(86) PCT No.: PCT/KR2020/009470
§ 371 (c)(1),
(2) Date: Jan. 24, 2022

(87) PCT Pub. No.: WO2021/015504
PCT Pub. Date: Jan. 28, 2021

(65) Prior Publication Data
US 2022/0240725 A1 Aug. 4, 2022

(30) Foreign Application Priority Data

Jul. 24, 2019 (KR) .......................... 10-2019-0089621
Jul. 24, 2019 (KR) .......................... 10-2019-0089622
(Continued)

(51) Int. Cl.
*A47J 43/07* (2006.01)
*A47J 19/02* (2006.01)
*A47J 43/046* (2006.01)

(52) U.S. Cl.
CPC ............ *A47J 43/0722* (2013.01); *A47J 19/02* (2013.01); *A47J 43/046* (2013.01)

(58) Field of Classification Search
CPC .......... A47J 19/02; A47J 19/027; A23L 11/45
See application file for complete search history.

(56) References Cited

U.S. PATENT DOCUMENTS 5,074,201 A * 12/1991 Takeyama ............. A47J 27/004
99/348
2014/0254302 A1 9/2014 Yang
2015/0164129 A1* 6/2015 Kim ...................... A47J 19/025
99/513

FOREIGN PATENT DOCUMENTS

JP 2015519994 A 7/2015
KR 100399422 B1 10/2003
(Continued)

OTHER PUBLICATIONS

Japanese Action (w/ English translation) for corresponding Japanese Application No. 2022-504700, issued Mar. 1, 2023, 8 pages.
(Continued)

*Primary Examiner* — Elizabeth Insler
(74) *Attorney, Agent, or Firm* — Dority & Manning, P.A.

(57) ABSTRACT

A mixer according to the present disclosure comprises: a mixer body including an outer container, a pulverizing blade and a blade driving unit for rotating the pulverizing blade; an inner container unit including an inner container disposed within the outer container, provided with the pulverizing blade, and having a lateral opening formed therein, and an inner container driving unit configured to rotate the inner container; and; a dewatering unit including a dewatering container which has a dewatering hole formed therethrough and surrounds the inner container while blocking the lateral opening to receive a mixing object in the inner container, and a dewatering container speed change device for chang- (Continued)

ing the rotational speed of the dewatering container, wherein a scraper protrudes from the outer side surface of the inner container to scrape down a blocking-component of the mixing object, which blocks the dewatering hole of the dewatering container.

23 Claims, 13 Drawing Sheets

(30) Foreign Application Priority Data

Jul. 24, 2019 (KR) .......................... 10-2019-0089623
Nov. 12, 2019 (KR) .......................... 10-2019-0144473

(56) References Cited

FOREIGN PATENT DOCUMENTS

| KR | 101065898 B1 | 9/2011 | | |
|----|--------------|--------|---|---|
| KR | 20110010557 | 11/2011 | | |
| KR | 101139865 | 5/2012 | | |
| KR | 101226441 | 1/2013 | | |
| KR | 101289989 B1 | 7/2013 | | |
| KR | 101311822 | 9/2013 | | |
| KR | 20130117977 | 10/2013 | | |
| KR | 101458793 B1 | 11/2014 | | |
| KR | 101458800 B1 | 11/2014 | | |
| KR | 20150017208 | 2/2015 | | |
| KR | 20160147081 | 12/2016 | | |
| KR | 101772862 B1 | * 8/2017 | .......... | A47J 43/0722 |
| KR | 101772862 | 9/2017 | | |
| KR | 20180037567 | 4/2018 | | |
| KR | 102081670 | 2/2020 | | |
| KR | 102104788 | 4/2020 | | |

OTHER PUBLICATIONS

International Search Report (with English Translation) for corresponding PCT Application No. PCT/KR2020/009470, mailed on Oct. 23, 2020, 6 pages.
Korean Prior Art Search Report for corresponding Application No. 10-2019-0089623, dated Feb. 23, 2024, 3 pages.
Korean Prior Art Search Report for corresponding Application No. 10-2019-0089621, dated Feb. 23, 2024, 6 pages.
Chinese Office Action for corresponding Chinese Application No. 202080052500.3, dated Sep. 29, 2022, 7 pages.
Extended European Search Report for corresponding European Application No. 20843696.4, dated Aug. 18, 2022, 10 pages.

* cited by examiner

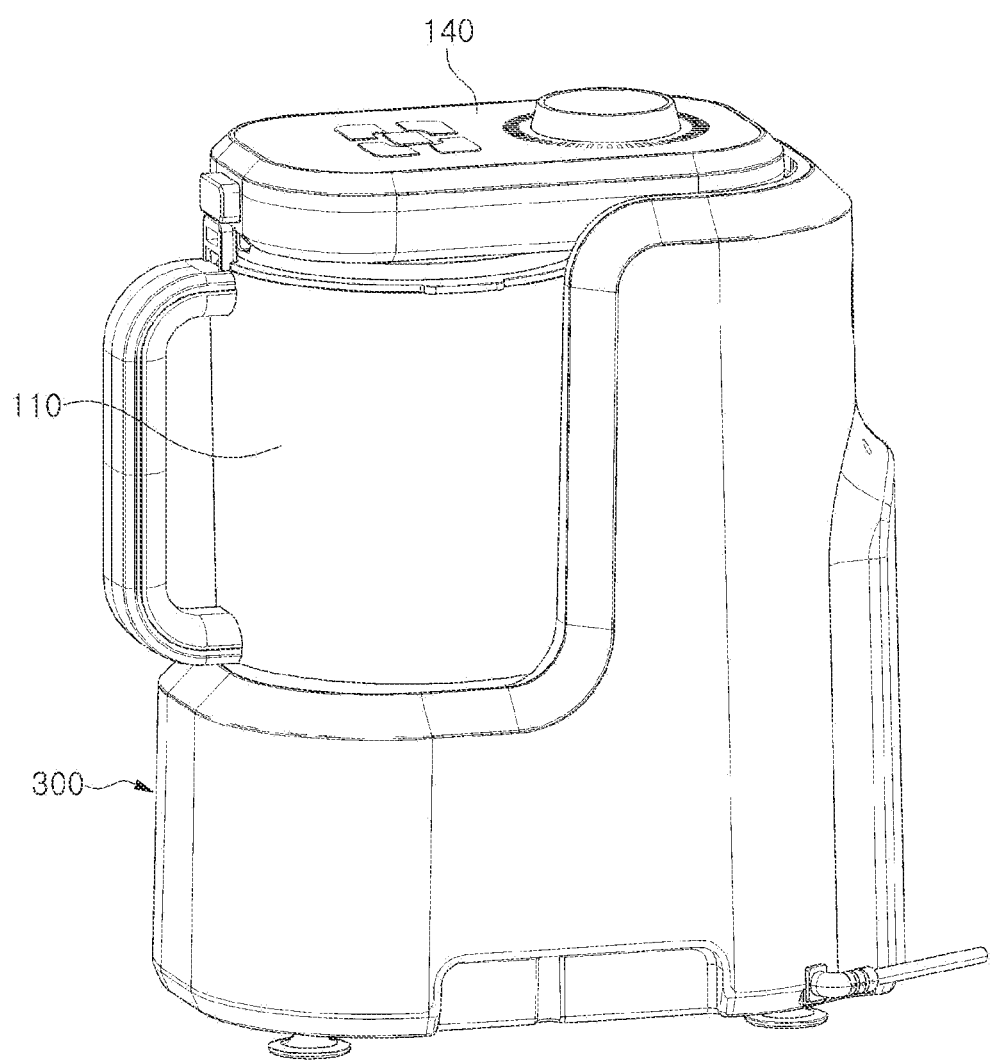
[FIG. 1]

[FIG. 2]
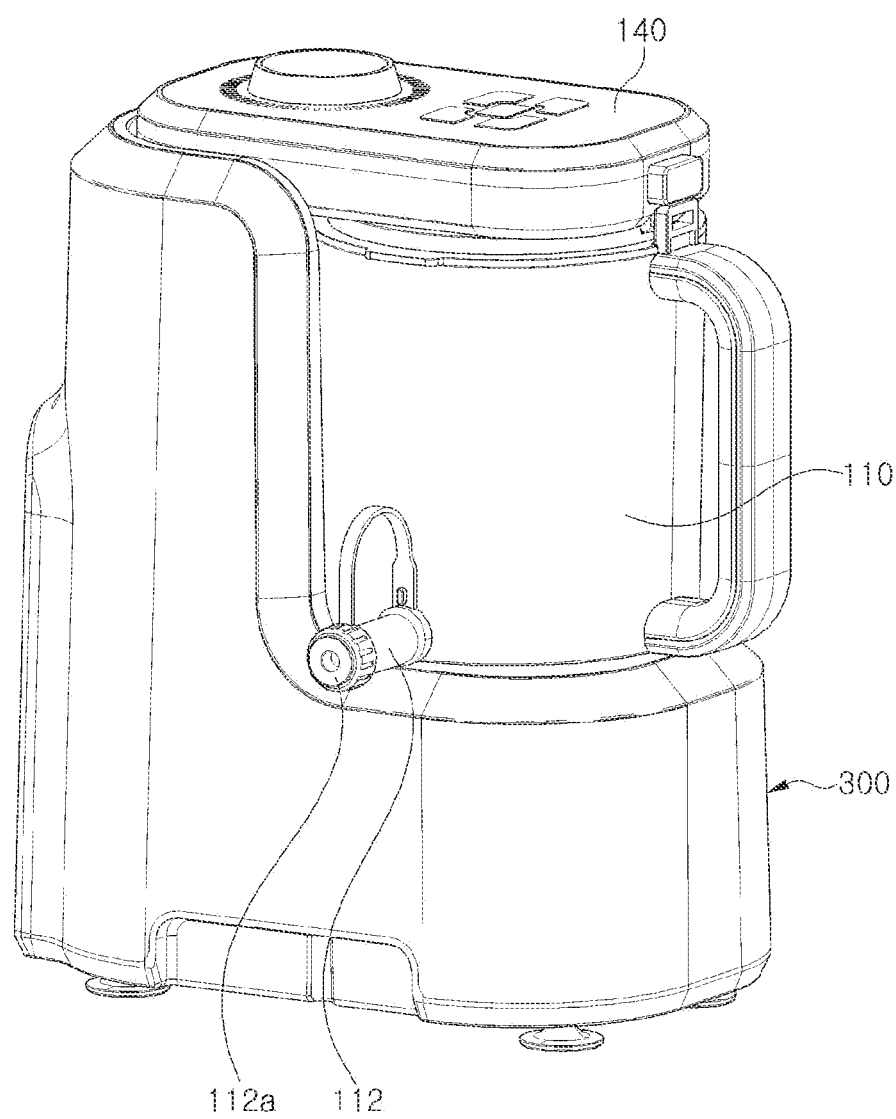

[FIG. 3]
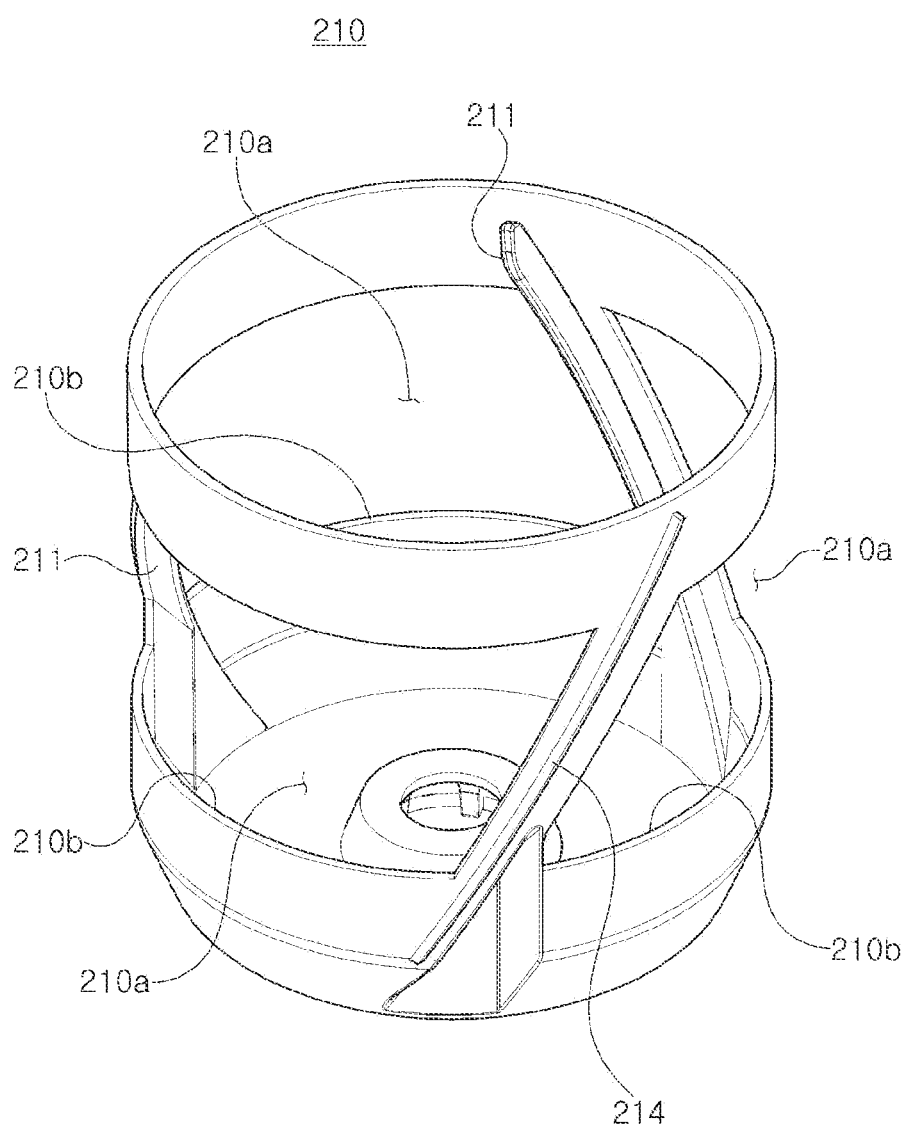

[FIG. 4]
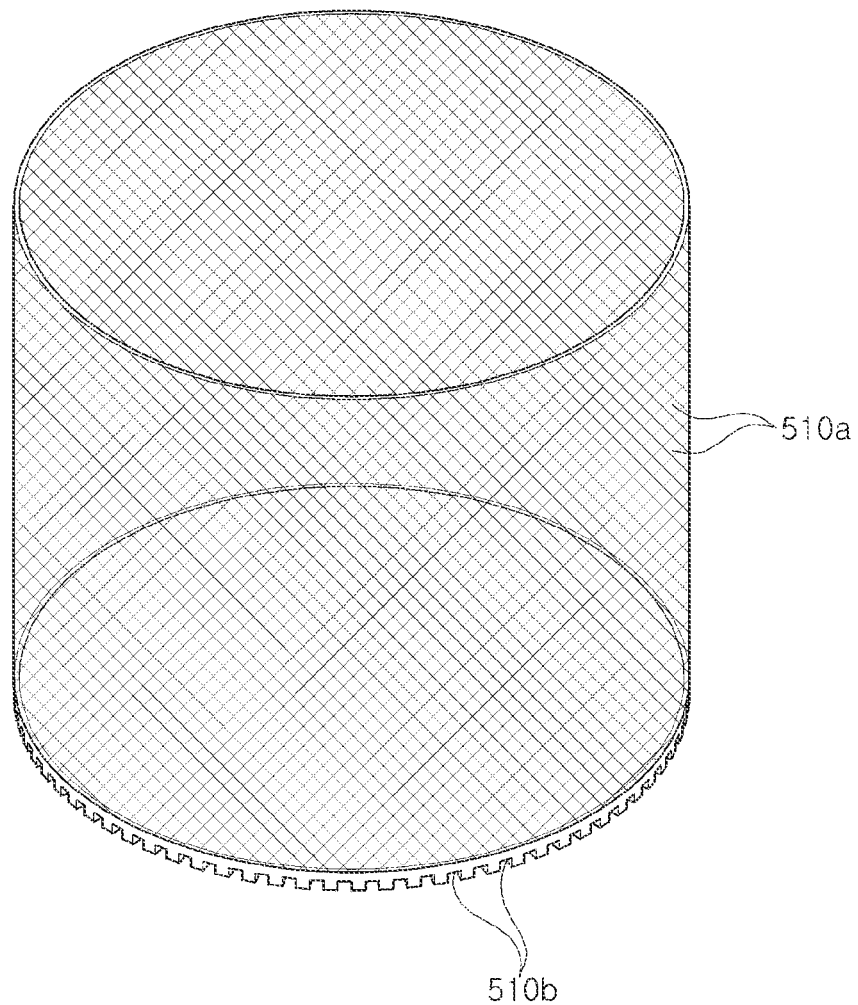

[FIG. 5]
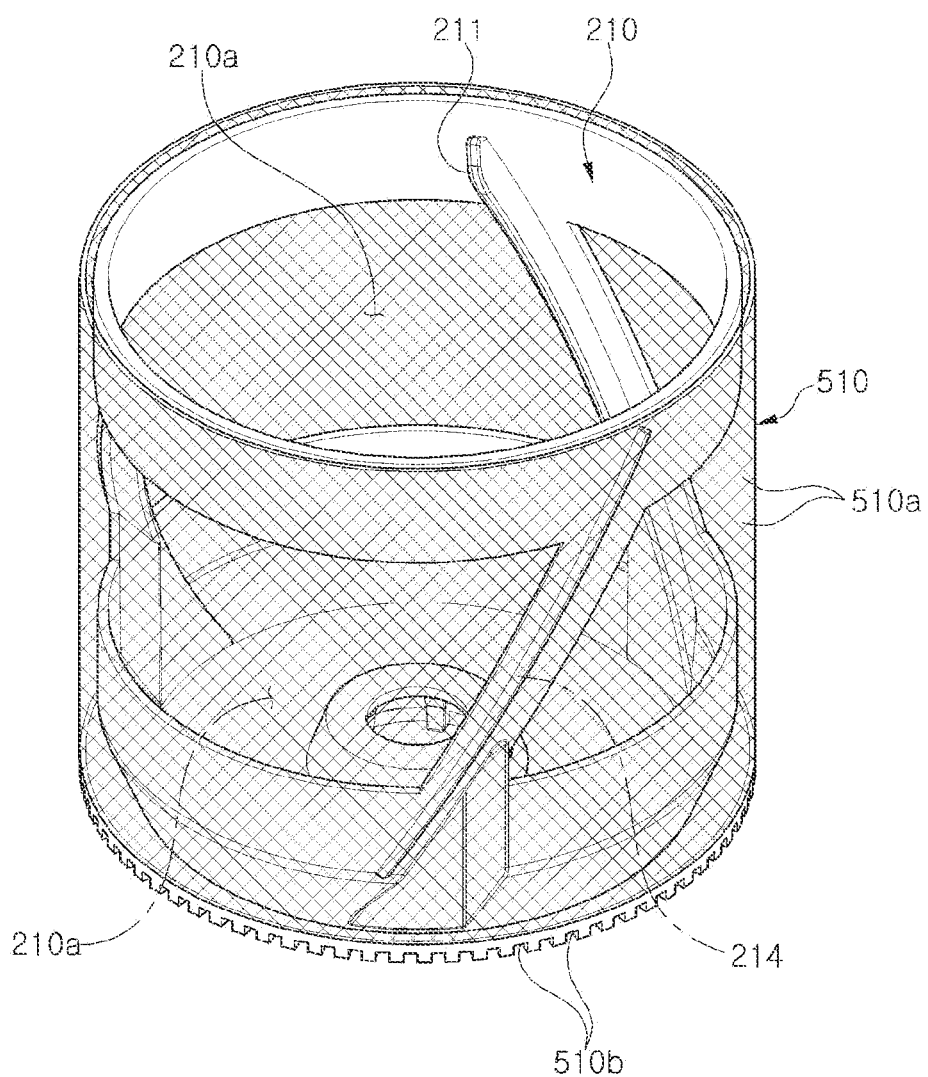

[FIG. 6]
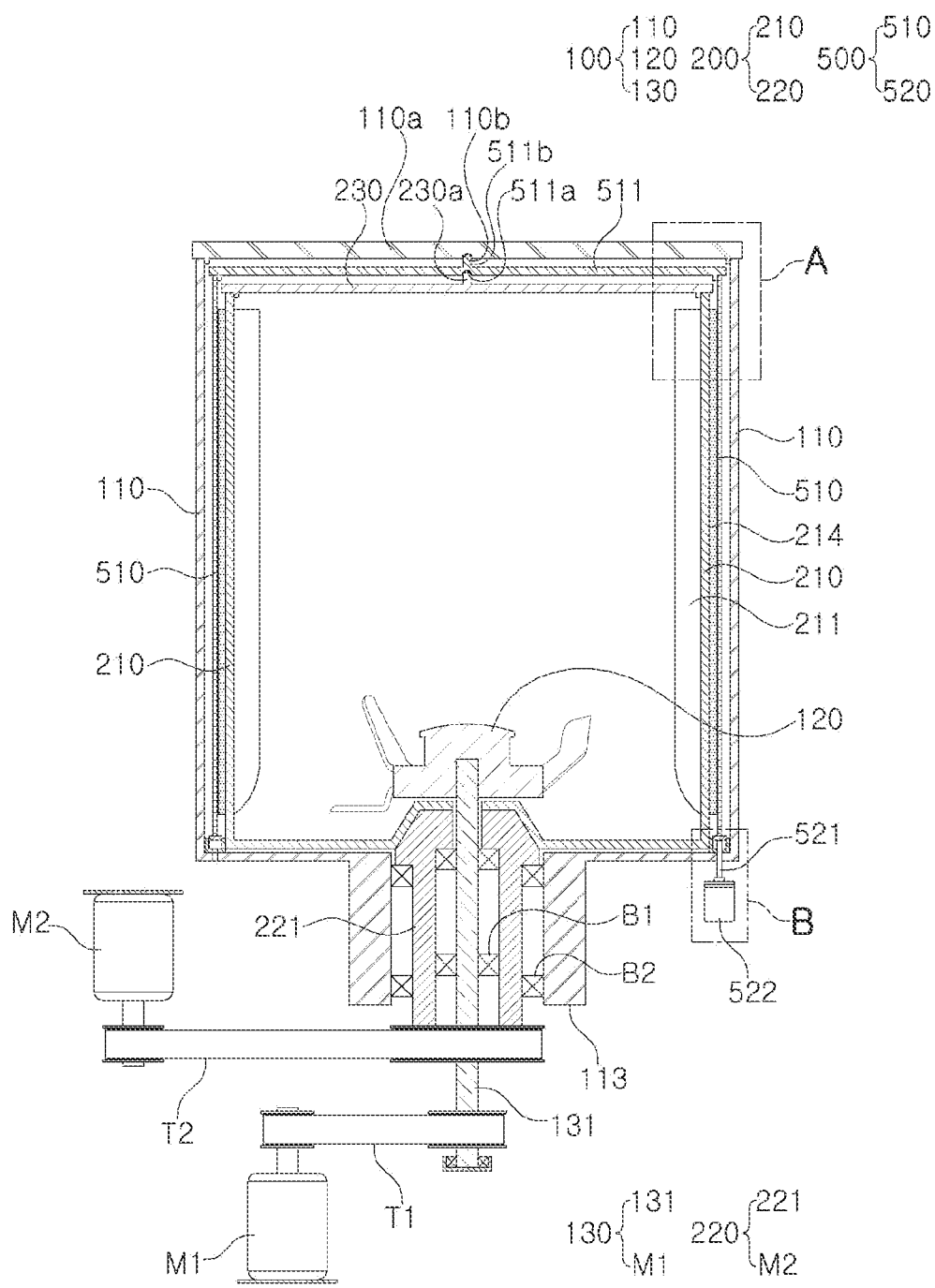

[FIG. 7]
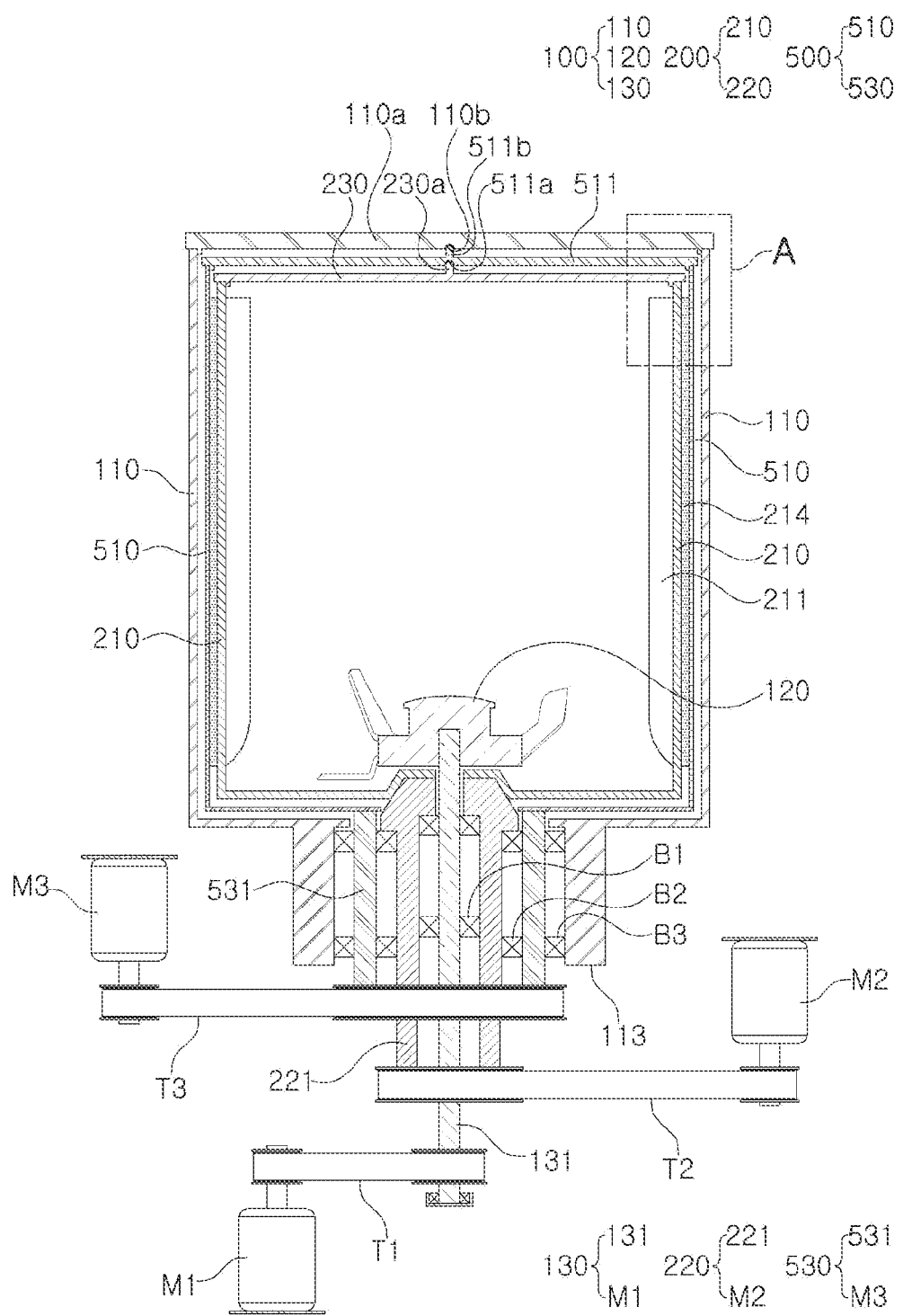

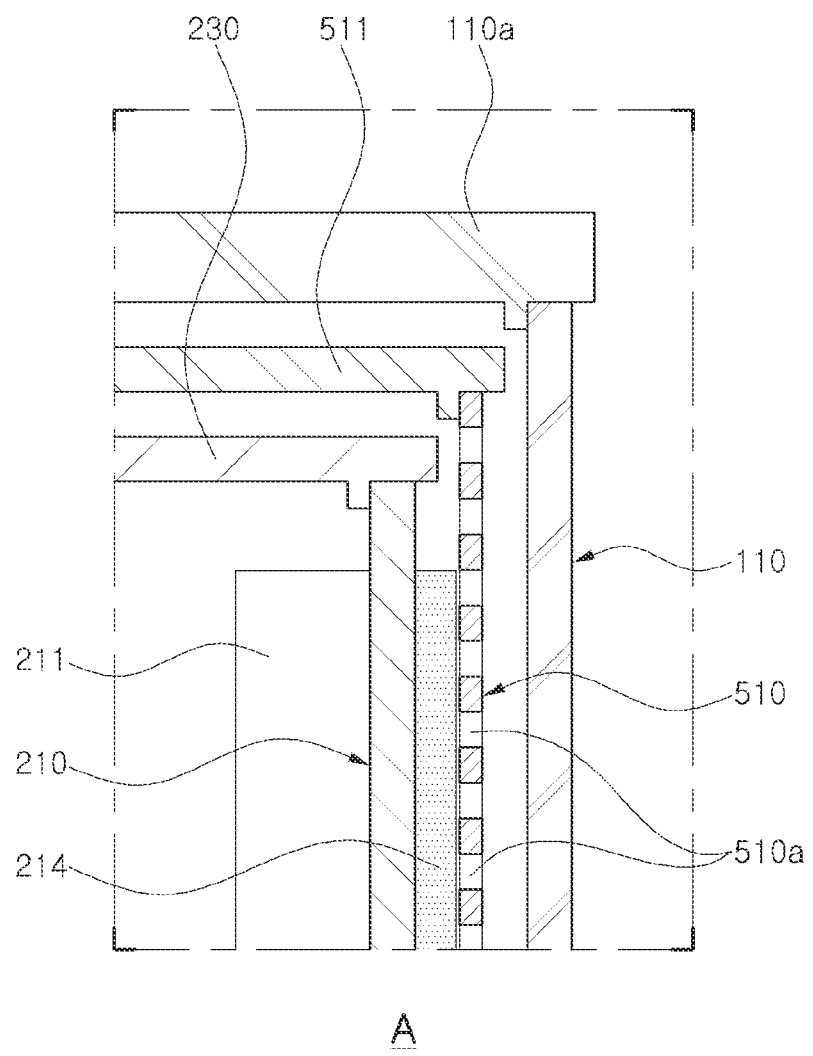
[FIG. 8]

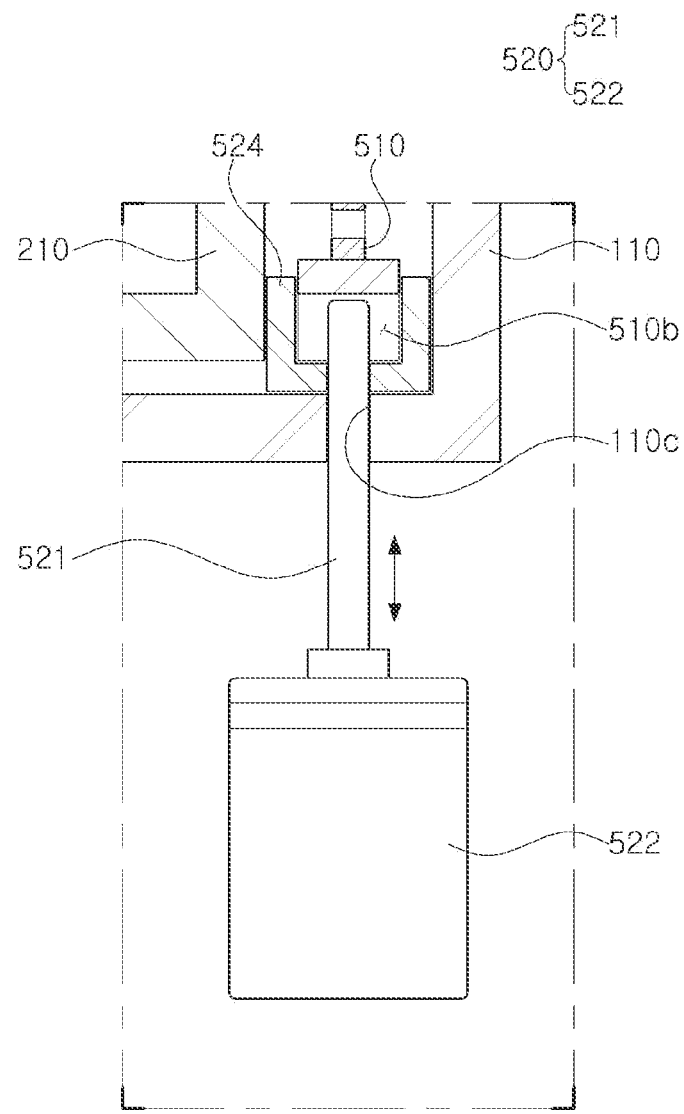
[FIG. 9]

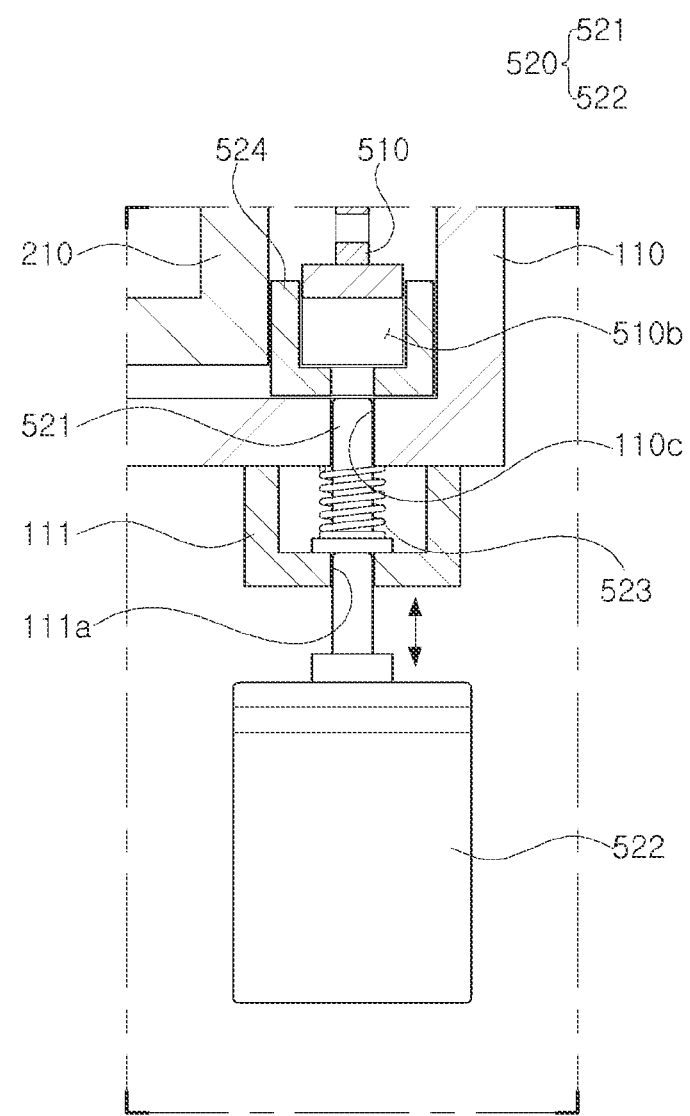
[FIG. 10]

[FIG. 11]
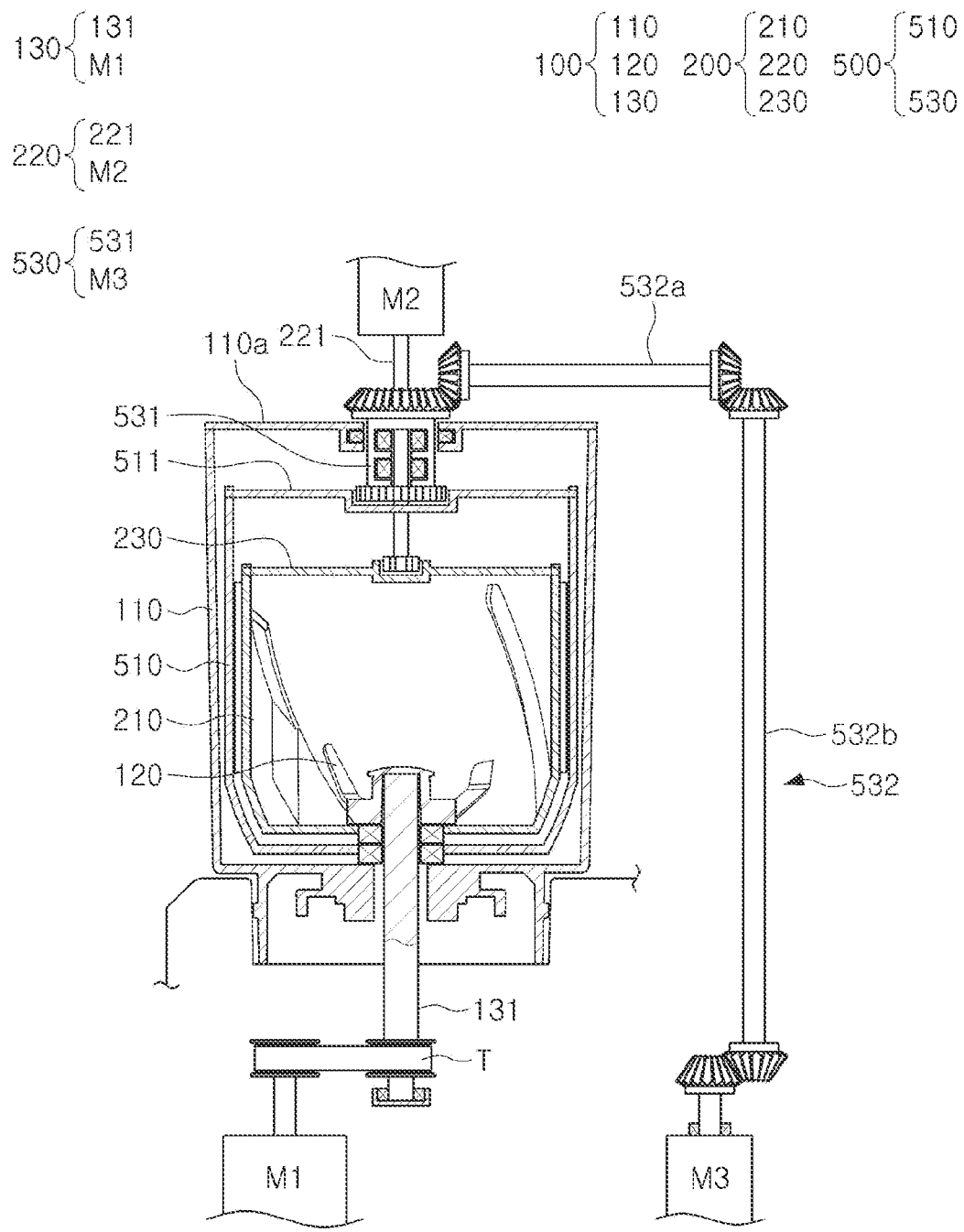

[FIG. 12]
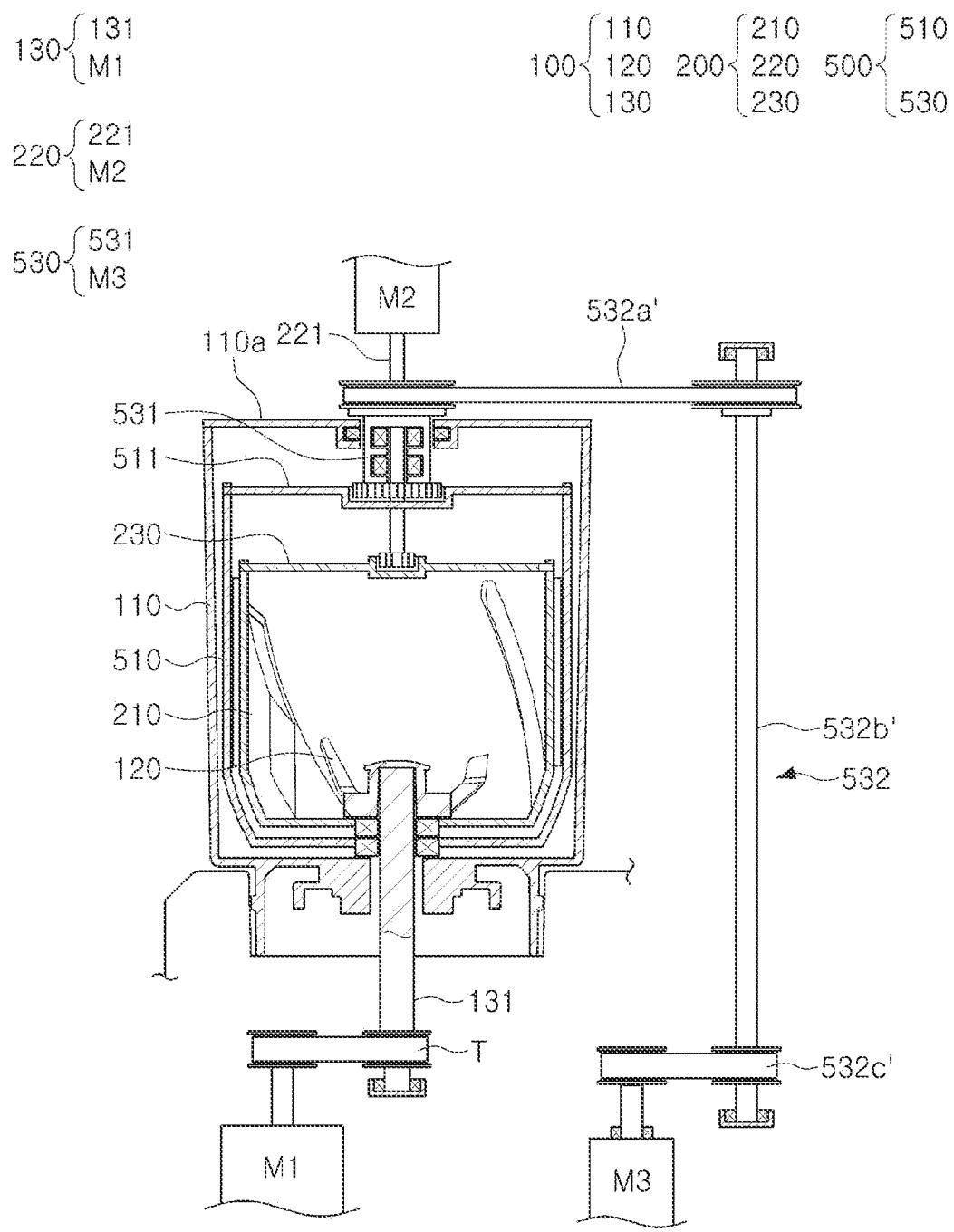

[FIG. 13]
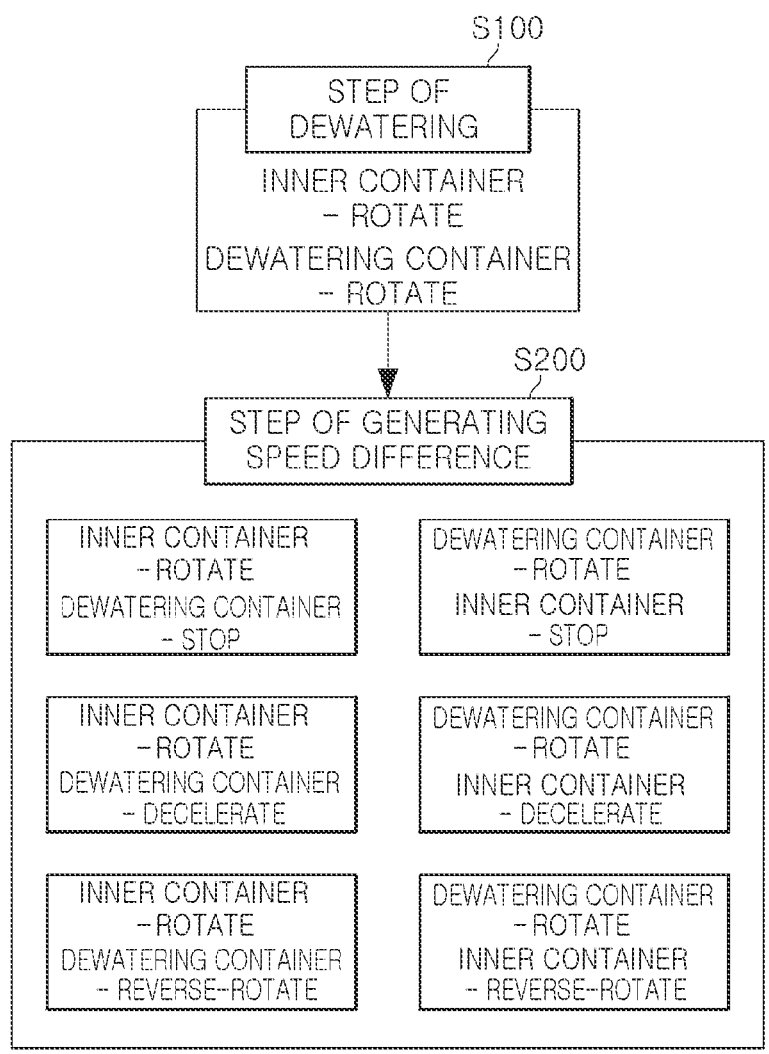

MIXER AND DEWATERING METHOD THEREOF

CROSS REFERENCE TO RELATED APPLICATIONS

This application is the U.S. National Stage entry of International Application No. PCT/KR2020/009470 filed under the Patent Cooperation Treaty and having a filing date of Jul. 17, 2020, which claims priority to Korean Patent Application No. 10-2019-0089621 having a filing date of Jul. 24, 2019, Korean Patent Application No. 10-2019-0089622 having a filing date of Jul. 24, 2019, Korean Patent Application No. 10-2019-0089623 having a filing date of Jul. 24, 2019, and Korean Patent Application No. 10-2019-0144473 having a filing date of Nov. 12, 2019, all of which are incorporated herein by reference.

TECHNICAL FIELD

The present disclosure relates to a mixer and a dewatering method thereof, and more particularly, a mixer which may produce juice by pulverizing and dewatering a mixing object while blending the mixing object, and a dewatering method thereof.

BACKGROUND ART

As for general mixers, even when a mixing object is pulverized by a pulverizing blade, a blocking component may be larger than a dewatering hole of a dewatering container, such that the component may block the dewatering hole of the rotating dewatering container, and accordingly, the dewatering action of the mixing object may be performed no more, which may be a limitation.

That is, in the case the mixing object has a seed, even when the seed is pulverized by the pulverizing blade, the particles thereof may be larger than the dewatering hole of the dewatering container, or even when a seed is not included, lumps having considerable viscosity may be formed, even after the mixing object is pulverized by the pulverizing blade. Accordingly, the seed or viscous lumps may not pass through the dewatering hole of the dewatering container and may block the dewatering hole. Thus, in a general mixer, the dewatering action may not be swiftly carried out through the dewatering hole of the dewatering container, which may be a problem.

DISCLOSURE

Technical Problem

An aspect of the present disclosure is to provide a mixer which may remove a blocking component of a mixing object blocking a dewatering hole of a dewatering container, and a dewatering method thereof.

Technical Solution

A mixer according to an example embodiment of the present disclosure includes a mixer body including an outer container, a pulverizing blade and a blade driving unit configured to rotate the pulverizing blade; an inner container unit including an inner container disposed within the outer container, provided with the pulverizing blade, and having a lateral opening formed therein, and an inner container driving unit configured to rotate the inner container; and; and a dewatering unit including a dewatering container configured to block the lateral opening by surrounding the inner container so as to accommodate the mixing object therein and to have a dewatering hole therein, and a dewatering container speed change device configured to change a rotational speed of the dewatering container, wherein a scraper protrudes from an outer side surface of the inner container to scrape off a blocking component of the mixing object blocking the dewatering hole of the dewatering container.

Advantageous Effects

A mixer and a dewatering method thereof according to the present disclosure may, by forming a scraper on an outer side surface of an inner container and generating a difference in rotational speeds between the inner container and a dewatering container to scrape off a blocking component of a mixing object blocking a dewatering hole of the dewatering container, have the effect of increasing efficiency of dewatering the mixing object.

BRIEF DESCRIPTION OF DRAWINGS

FIGS. 1 and 2 are diagrams illustrating a mixer according to an example embodiment of the present disclosure;

FIG. 3 is a diagram illustrating an inner container of the mixer in FIG. 1;

FIG. 4 is a diagram illustrating a dewatering container of the mixer in FIG. 1;

FIG. 5 is a diagram illustrating an example in which an inner container is inserted into the dewatering container in FIG. 3;

FIG. 6 is a schematic diagram illustrating a cross-sectional surface of a mixer according to an example embodiment of the present disclosure; and FIG. 7 is a schematic diagram illustrating a cross-sectional surface of a mixer according to another example embodiment of the present disclosure;

FIG. 8 is an enlarged diagram illustrating region A in FIGS. 6 and 7;

FIG. 9 is an enlarged diagram illustrating region B in FIG. 6, viewed from the side;

FIG. 10 is a diagram illustrating another example of region B in FIG. 9;

FIG. 11 is a schematic diagram illustrating a cross-sectional surface of a mixer according to another example embodiment of the present disclosure;

FIG. 12 is a schematic diagram illustrating an example in which a shaft connection member of another example embodiment is configured in the mixer in FIG. 11; and FIG. 13 is a flowchart illustrating a dewatering method of a mixer according to an example embodiment of the present disclosure.

BEST MODE FOR INVENTION

Hereinafter, the present disclosure will be described in greater detail through embodiments. However, it should be noted that, in adding reference numerals to the components in each drawing, the same components may have the same reference numerals, even though the components are depicted in different drawings. Also, in describing the present disclosure, when it is determined that a detailed description of a related known configuration or function may obscure the gist of the present disclosure, the detailed description thereof will not be provided.

FIGS. 1 and 2 are diagrams illustrating a mixer according to an example embodiment. FIGS. 3 and 4 are diagrams illustrating an inner container and a dewatering container of the mixer in FIG. 1. FIG. 5 is a diagram illustrating an example in which an inner container is inserted into the dewatering container in FIG. 3.

FIGS. 6 and 7 are schematic diagrams illustrating a cross-sectional surface of a mixer according to an example embodiment.

Referring to the drawings, the mixer according to the present disclosure may include a mixer body 100, an inner container unit 200, and a dewatering unit 500.

Here, the mixer body 100 may include an outer container 110, a pulverizing blade 120 and a blade driving unit 130.

Specifically, the outer container 110 may include the inner container 210 of the inner container unit 200 therein, and may have an upwardly open structure in which an upper portion thereof is open.

Also, the outer container 110 may be supported by a container support case 300, and the container support case 300 may have an L-shape overall, as illustrated in the drawings. In this case, a mixer cover 140 covering the outer container 110 may be rotatably installed in the container support case 300.

Also, the outer container 110 may have a discharge tube 112 formed in a lower portion such that the juice dewatered from a mixing object may be discharged to the outside, and an opening/closing valve 112*a* may be mounted on the discharge tube 112.

The pulverizing blade 120 may be disposed within the outer container 110, and may be configured to pulverize the mixing object in the outer container 110 while rotating. In this case, the mixing object may refer to food to be pulverized by operating the mixer.

Also, the blade driving unit 130 may be configured to provide driving force for rotating the pulverizing blade 120, and may include a blade rotating shaft 131 and a blade driving motor M1.

The blade rotating shaft 131 may be connected to the lower portion of the pulverizing blade 120 in the vertical direction, and the blade driving motor M1 may be connected to the blade rotating shaft 131.

That is, the blade rotating shaft 131 may be connected to a center of the pulverizing blade 120 and may extend in the longitudinal direction, and by connecting the pulverizing blade 120 to the blade driving motor M1, the rotation driving force of the blade driving motor M1 may be transferred to the pulverizing blade 120 such that the pulverizing blade 120 may be driven to rotate when the blade driving motor M1 operates.

In this case, the blade rotating shaft 131 and the blade driving motor M1 may be connected to each other via a first timing belt T1.

Meanwhile, the inner container unit 200 may include an inner container 210 and an inner container driving unit 220.

Here, the inner container 210 may be disposed within the outer container 110, the pulverizing blade 120 may be disposed therein, and the inner container 210 may have an upwardly open structure in which an upper portion is open, and the blade driving unit 130 may penetrate a lower portion of the inner container 210.

Also, the inner container 210 may include a protrusion 211 on an inner side surface such that the mixing object rotating and flowing while being pulverized by the pulverizing blade 120 may be caught by the protrusion.

Also, the inner container driving unit 220 may be connected to the inner container 210 and may be configured to rotate the inner container 210, and the inner container driving unit 220 may be provided separately from the blade driving unit 130 for rotating the pulverizing blade 120.

Specifically, the inner container driving unit 220 may include an inner container rotating shaft 222 and an inner container driving motor M2.

Here, the inner container rotating shaft 222 may be connected to the lower portion of the inner container 210 in the vertical direction, and the inner container driving motor M2 may be connected to the inner container rotating shaft 222.

That is, the inner container rotating shaft 222 may be connected to the lower portion of the inner container 210 and may extend in the longitudinal direction, by connecting the inner container 210 to the inner container driving motor M2, the rotation driving force of the inner container driving motor M2 may be transferred to the inner container 210 such that the inner container 210 may be driven to rotate when the inner container driving motor M2 operates.

In this case, the inner container rotating shaft 222 and the inner container driving motor M2 may be connected to each other via a second timing belt T2.

The blade driving unit 130 and the inner container driving unit 220 may be controlled by an electrically connected controller (not illustrated).

Meanwhile, in a general mixer, as the pulverizing blade rotates in only one direction, the mixing object may continuously rotate in only one direction in the mixer container, and the mixing object may be maintained like a wall while being pushed toward the inner side surface of the mixer container, and may not retract to the pulverizing blade, such that pulverizing performance may significantly deteriorate.

In a general mixer, a protrusion may be formed on the inner wall of the mixer container such that a certain amount of vortex may be formed in the mixing object, and the vortex may also be implemented as a flow with a regular pattern, such that the mixing object may not be properly pulverized.

Accordingly, in the mixer according to the present disclosure, the controller may control the inner container driving unit 220 to mix the mixing object while varying rotation of the inner container 210 to implement an irregular flow in the mixing object of the inner container 210.

As an example embodiment, the controller may control the blade driving unit 130 and the inner container driving unit 220 such that the pulverizing blade 120 and the inner container 210 may rotate in opposite directions.

In this case, the controller may repeatedly turn the power of the inner container driving unit 220 on and off, and when the power is turned off, the inner container 210 may rotate forwards on inertia without power, and may be interlocked with rotational force of the mixing object by the pulverizing blade 120 and may rotate in reverse.

That is, the controller may control the blade driving unit 130 and the inner container driving unit 220, such that, while the pulverizing blade 120 and the inner container 210 may rotate in opposite directions, the inner container driving unit 220 may be repeatedly controlled to be turned on and off, and accordingly, when the power of the inner container driving unit 220 is turned on, the inner container 210 may in reverse rotate (rotating in the direction opposite to the pulverizing blade 120), and when the power of the inner container driving unit 220 is turned off, the inner container 210 may rotate forwards on inertia without power, the rotational speed may decrease, and the inner container 210 may rotate forwards (rotating in the same direction as the pulverizing blade 120) by the rotational force of the mixing object by the pulverizing blade 120.

In other words, the inner container 210 may receive the driving force from the inner container driving unit 220 only when the controller turns on the power of the inner container driving unit 220, and when the controller turns off the power of the inner container driving unit 220, the inner container 210 may not receive the driving force from the inner container driving unit 220 such that the inner container 210 may rotate on inertia and may rotate forwards by being interlocked with the rotational force of the mixing object.

Particularly, to break the balanced state of the mixing object in the inner container 210, the controller may control the inner container driving unit 220 such that the inner container 210 may mix the mixing object while repeating the pattern in which the inner container 210 may rotate in reverse and stop in the direction opposite to the rotation direction of the pulverizing blade 120, or the pattern in which the inner container 210 may rotate in reverse and may change speed.

As another example embodiment, the inner container driving unit 220 may include a DC motor and a switch circuit, or may include an AC motor and an inverter, such that the inner container 210 may rotate forwards and in reverse by the driving force of the inner container driving unit 220 under the control of the controller.

That is, as the switch circuit or the inverter of the inner container driving unit 220 is used, the inner container 210 may be driven to rotate by receiving the driving force from the inner container driving unit 220 when the inner container 210 rotates in reverse and also rotate forwards under the control of the controller.

As described above, in the mixer according to the present disclosure, as the inner container driving unit 220 is controlled to mix the mixing object while varying the rotation direction of the inner container 210 by the controller, and particularly, as the variation of rotation of the inner container 210 in which the inner container driving unit 220 is repeatedly turned on and off such that the inner container 210 may rotate in reverse for a predetermined period of time and stop and may rotate in reverse for a predetermined period of time and stop again by the controller is implemented, the balanced state of the mixing object may be broken. Accordingly, the mixing object may not be stacked up like a wall on the inner side surface of the inner container 210, and may return to the pulverizing blade 120 rotating in the center of the inner container 210, such that the pulverizing performance may significantly increase.

That is, the mixer according to the present disclosure may be configured to break the balanced state of the mixing object, such that the mixing object maintained like a wall on the inner side of the inner container 210 may collapse, thereby increasing pulverizing performance for the mixing object.

Specifically, the mixing object may move to the inner side surface of the inner container 210 by the centrifugal force by rotation of the pulverizing blade 120 while being mixed, and in this case, when the balance of the force between the particles of the mixing object is formed, the mixing object may stop and may not move any more, and the mixing object may not move toward the pulverizing blade 120 and may be no longer pulverized.

In the mixer according to the present disclosure, however, as the pattern in which the rotation direction of the inner container 210 changes or the inner container 210 rotates in reverse and stops, or the pattern in which the inner container 210 rotates in reverse and changes the speed thereof is repeated, the balance of the force between the particles of the mixing object may change to an unbalanced state.

Accordingly, the particles may flow again and may move to move toward the pulverizing blade 120 while flowing, such that the pulverizing may be continuously performed.

Also, in the mixer according to the present disclosure, when the blade driving unit 130 and the inner container driving unit 220 rotate the pulverizing blade 120 and the inner container 210 in opposite directions, or particularly, the pattern in which the inner container 210 rotates in reverse and stops or the pattern in which the inner container 210 rotates in reverse and changes the speed thereof is repeated, the effect of pulverizing the mixing object may further increase by the shape structure of the protrusion 211.

Specifically, the protrusion 211 may have the shape of a screw protrusion line guiding a downward spiral flow of the mixing object such that the mixing object may flow downwardly while rotating in the opposite direction to the rotation of the pulverizing blade 120.

Specifically, as for the flow of the mixing object rotating in one direction by the pulverizing blade 120, as the pulverizing blade 120 is disposed on the lower side in the inner container 210, while the pulverizing blade 120 rotates, the pulverizing blade 120 may be pushed up to the inner side of the inner container 210 and may rise upwardly along the inner side surface of the inner container 210. Accordingly, the mixing object flowing upwardly while receiving the centrifugal force as described above may minimally flow toward the pulverizing blade 120 disposed on the lower side in the inner container 210.

Accordingly, to allow the mixing object flowing as above to flow toward the pulverizing blade 120 disposed on the lower side in the inner container 210, when the pulverizing blade 120 and the inner container 210 rotate in opposite directions, the protrusion 211 may have the shape of a screw protrusion line to allow the mixing object to flow downwardly while rotating in the opposite direction to the direction of rotation of the pulverizing blade 120, thereby guiding the downward spiral flow of the mixing object.

That is, the mixing object, which may come into contact with the inner side surface of the inner container while rotating in one direction, may collide with the screw protruding line rotating in the opposite direction and may move downwardly along the spiral structure of the screw protruding line, such that the mixing object may flow toward the pulverizing blade 120 disposed on the lower side in the inner container 210, thereby increasing the pulverizing effect of the mixer.

Meanwhile, the dewatering unit 500 may be configured to dewater the pulverized mixing object after the mixing object is pulverized by the pulverizing blade 120, that is, to separate the juice from the mixing object.

Here, the dewatering unit 500 may include a dewatering container 510.

In this case, the inner container 210 may include a lateral opening 210a on the side surface thereof such that the inner and outer portions are connected to each other, the dewatering container 510 may be configured to block the lateral opening 210a of the inner container 210, and a dewatering hole 510a may be formed on the side portion.

That is, the dewatering container 510 may have the structure of blocking the lateral opening 210a by surrounding the inner container 210, such that the mixing object accommodated in the inner container 210 may be prevented from coming out of the inner container 210 through the lateral opening 210a of the inner container 210.

Specifically, the lateral opening 210a may be disposed at a predetermined height from the side portion of the inner container 210. That is, the inner container 210 may be a lower component of the lateral opening 210a, and the liquid accommodation projection 210b may be formed on the lower side of the side portion preferably, which may increase the mixing effect when a certain amount of liquid (as an example, separately supplied water or the juice created from the mixing object when pulverizing the mixing object) is present when the mixing object is mixed.

Even when the liquid accommodation projection 210b is formed on the lower side of the side portion of the inner container 210, the inner container 210 may rotate at a much faster speed when dewatering the mixing object than when pulverizing, such that the mixing object, which has already been pulverized in the pulverizing process, may easily move upwardly along the inner side surface of the liquid accommodation projection 210b and may rise to the lateral opening 210a, which is the upper side of the liquid accommodation projection 210b, and the juice may be dewatered through the dewatering hole 510a of the dewatering container 510 blocking the lateral opening 210a.

As an example, the liquid accommodation projection 210b may have a height between 205 and 50% of the height of the inner container 210, and when the height is lower than 20% of the height of the inner container 210, the amount of liquid may be small, such that it may not be sufficient to enhance the mixing effect. When the height is greater than 50% of the height of the inner container 210, the juice generated from the mixing object may not exceed the liquid accommodation projection 210b and may not reach the dewatering container 51, such that the dewatering action may be rarely performed.

The dewatering unit 500 having the inner container 210 and the dewatering container 510 may, as the inner container 210 and the dewatering container 510 rotate together in the same direction, dewater the mixing object pulverized by the pulverizing blade 120.

However, even when the mixing object is pulverized by the pulverizing blade 120, the mixing object may have a blocking component than the dewatering hole 510a of the dewatering container 510 depending on the type of the object, such that the mixing object may block the dewatering hole 510a of the dewatering container 510, and the action of dewatering the mixing object may no longer be performed.

That is, when the seeds are included in the mixing object, the mixing object may have particles larger than the dewatering hole 510a of the dewatering container 510 even when the seeds are pulverized by the pulverizing blade 120, or even when the seeds are not included, lumps having considerable viscosity may be present even after the mixing object is pulverized by the pulverizing blade 120, and accordingly, the seeds or lumps having viscosity may not pass through the dewatering hole 510a of the dewatering container 510 and may block the dewatering hole 510a, such that the dewatering action through the dewatering hole 510a of the dewatering container 510 may not be smoothly performed.

For reference, in this present disclosure, a component of the mixing object blocking the dewatering hole 510a during the dewatering process, such as a seed or viscous lumps, will be referred to as a blocking component of the mixing object.

To address the above-described issue, a scraper 214 may be formed on the outer side surface of the inner container 210 in the present disclosure.

The scraper 214 may protrude from the outer side surface of the inner container 210, and when there is a difference in the rotational speeds between the inner container 210 and the dewatering container 510, the scraper 214 may scrape off the blocking component of the mixing object blocking the dewatering hole 510a of the dewatering container 510.

That is, the scraper 214 of the inner container 210 may scrape off the blocking component of the mixing object protruding from the inner side surface of the dewatering container 510 while blocking the dewatering hole 510a of the dewatering container 510 from the inner side surface of the dewatering container 510 when there is a difference in the rotational speeds between the inner container 210 and the dewatering container 510.

Specifically, the scraper 214 may be formed in the longitudinal direction from the outer side surface of the inner container 210, and may be configured to protrude to the inner side surface of the dewatering container 510. The scraper 214 may scrape off the mixing object present in the dewatering hole 510a of the dewatering container 510 or attached to the inner side surface of the dewatering container 510 from the entire portion of the dewatering container 510 by the above-described structure.

Furthermore, a plurality of the lateral openings 210a may be formed in the transverse direction from the side portion of the inner container 210, thereby increasing the dewatering performance for the mixing object.

Also, a plurality of the scrapers 214 may be disposed between the plurality of lateral openings 210a, such that, even when the difference in speeds between the inner container 210 and the dewatering container 510 is maintained for a relatively short period of time, the scrapers 214 may scrape off the blocking component from the entire portion of the dewatering container 510, and also, the blocking components of the mixing object not being easily separated may be properly scraped off as the scrapers 214 scrape the component off several times while rotating.

Also, to obtain the structure in which the dewatering container 510 may block the lateral opening 210a of the inner container 210 such that the mixing object may not be discharged through the lateral opening 210a, as illustrated in FIG. 10, the protrusion height of the scraper 214 protruding from the outer side surface of the inner container 210 may be configured to be lower than the protrusion height of the protrusion 211 protruding from the inner side surface of the inner container 210, and may have a protrusion height protruding slightly preferably.

Meanwhile, in the present disclosure, to generate a difference in rotational speeds between the inner container 210 and the dewatering container 510, as illustrated in FIGS. 6, 9, and 10 as an example embodiment, the dewatering unit 500 and the dewatering container 510 described above may each have a dewatering container speed change device.

In this case, the dewatering container speed change device may include a dewatering container speed limiting unit 520 for limiting the rotational speed of the dewatering container.

The dewatering container speed limiting unit 520 may be configured to limit the rotational speed of the dewatering container 510, that is, to stop or decelerate the rotation of the dewatering container 510.

Here, the rotational movement of the dewatering container 510 will be described first.

The dewatering container 510 may have a structure configured to block the lateral opening 210a by enclosing the inner container 210, and even when a separate rotational driving force is not provided by this structure, the dewatering container 510 may rotate together while the inner container 210 rotates.

Specifically, the mixing object rotating by the rotation of the inner container 210 may be in contact with the inner side surface of the dewatering container 510 through the lateral opening 210a of the inner container 210, such that the dewatering container 510 may rotate in the rotation direction of the mixing object and may rotate in the same direction as the inner container 210.

The rotational speed of the dewatering container 510 rotating as above may be limited by the dewatering container speed limiting unit 520, and the structure of the dewatering container speed limiting unit may be as below.

The dewatering container speed limiting unit 520 may include a stop pin 521 and a pin driving member 522 as illustrated in FIGS. 6 and 9 as an example.

In this case, the dewatering container 510 may include a plurality of stop grooves 510b along the lower edge thereof, and the stop pin 521 may rise toward the stop groove 510b of the dewatering container 510, and may stop the rotation of the dewatering container 510 by being drawn and caught into the stop groove 510b.

Also, the pin driving member 522 may be configured to lift the stop pin 521. As an example, a solenoid container may be used, but an example embodiment thereof is not limited thereto, and any generally used driving member may be used as long as the driving member may stably lift the stop pin 521.

For reference, when the pin driving member 522 is a solenoid container, the stop pin 521 may be a cylinder rod or a member connected to the cylinder rod.

Meanwhile, the stop pin 521 may not be connected to the pin driving member 522 as illustrated in FIGS. 6 and 9, and as another example, the pin driving member 522 may be configured to be separated from the pin driving member 522 as illustrated in FIG. 10.

Specifically, the outer container 110 may include a stop hole 110c in which the stop pin 521 moves up and down in the lower portion thereof, and a pin accommodation bracket 111 may be formed to accommodate the stop pin 521 on the lower side of the top hole 110c in the lower portion.

Also, the dewatering container speed limiting unit 520 may further include an elastic member 523.

The elastic member 523 may be disposed between the head of the stop pin 521 and the lower surface of the outer container 110, such that, when the lifting pressure of the pin driving member 522 with respect to the stop pin 521 is released, the elastic member 523 may provide elastic force to move down the stop pin 521 while the state in which the stop pin 521 blocks the stop hole 110c is maintained.

That is, when the pin driving member 522 operates and the cylinder rod 522a raises such that the lower end of the stop pin 521, that is, the head of the stop pin 521 is pushed and raised by the bracket hole 111a, the elastic member 523 may be compressed, and the stop pin 521 may rise through the stop hole 110c of the outer container 110 and may be inserted into the stop groove 510b of the dewatering container 510, thereby stopping the rotation of the dewatering container 510. Conversely, when the cylinder rod 522a is reduced, the upward pressure on the stop pin 521 may be released, such that the elastic member 523 may expand and push the head of the stop pin 521 to move down such that the stop pin 521 may be released from the stop groove 510b of the dewatering container 510. In this case, the stop pin 521 may not completely come out from the stop hole 110c and the upper portion thereof may maintains the state of remaining in the stop hole 110c. Accordingly, the liquid dewatered from the mixing object from flowing out through the stop hole 110c of the outer container 110 may be prevented when the outer container 110 rotates and is removed from the container support case 300 (in FIG. 1), and further, in the vacuum mixer, operating in a vacuum, the vacuum in the outer container 110 may be prevented from being released.

For reference, to allow the stop pin 521 to be smoothly and easily inserted into the stop groove 510b of the dewatering container 510, the controller may control the inner container driving unit 220 to decrease the rotational speed of the inner container 210 to a certain extent, such that the rotational speed of the mixing object may be lowered, and accordingly, the dewatering container 510 may slowly rotate while being interlocked therewith.

Also, the dewatering unit 500 may further include a dewatering container support rail 524.

The dewatering container support rail 524 may be disposed within the outer container 110, and the lower rim of the dewatering container 510 may be seated therein and the dewatering container support rail 524 may support the dewatering container 510 to slide and rotate.

The dewatering container support rail 524 may be configured to allow the dewatering container 510 to stably rotate without shaking while the dewatering container 510 rotates, and the specific structure thereof is not limited to any particular example, and any generally used structure may be used.

The dewatering container speed limiting unit 520 may include a friction pad and a pad driving member to reduce the rotational speed of the dewatering container 510, not illustrated in the drawings.

When the friction pad may rise to the lower side of the dewatering container 510 and may be in contact with the lower portion of the dewatering container 510, such that the rotational speed of the dewatering container 510 may be reduced.

Also, the pad driving member may be connected to the friction pad, and may be configured to lift the friction pad. As an example, a solenoid container may be used.

Further, in the present disclosure in which the above-described dewatering container speed limiting unit 520 is provided, the blade rotating shaft 131 may be disposed within the hollow of the inner container rotating shaft 221, and the blade rotating shaft 131 and the inner container rotating shaft 221 may rotate independently of each other.

Specifically, a first bearing B1 may be installed between the blade rotating shaft 131 and the inner container rotating shaft 221, and a second bearing B2 may be installed between the lower extension portion 113 extending from the lower portion of the outer container 110 and formed around the inner container rotating shaft 221 and the inner container rotating shaft 221.

In this case, the second bearing B2 may be a one-way bearing, and the second bearing B2 may, when the mixing object rotates in high speed by the high-speed rotation of the blade rotating shaft 131, prevent the inner container 210, which may have to rotate in the opposite direction of the blade rotating shaft 131, from rotating in the same direction as the blade rotating shaft 131 by the mixing object rotating in high speed.

The open upper portion of the outer container 110 may be opened and closed by the outer container cover 110a, the open upper portion of the dewatering container 510 may be opened and closed by the dewatering container cover 511, and the open upper portion of the inner container 210 may be opened and closed by the inner container cover 210.

Here, an outer container cover groove 110b may be formed on the lower surface of the outer container cover 110a, and a dewatering container cover projection 511a configured to be inserted into the outer container cover groove 110b and to be rotatable may be formed on the upper surface of the dewatering container cover 511.

In this case, a dewatering container cover groove 511a may be formed on the lower surface of the dewatering container cover 511, and an inner container cover projection 230a configured to be inserted into the dewatering container cover groove 511a and to be rotatable may be formed on the upper surface of the inner container cover 210.

By the structure of the covers described above, the inner container 210 and the dewatering container 510 may rotate stably without shaking.

FIG. 11 is a schematic diagram illustrating a cross-sectional surface of a mixer according to another example embodiment. FIG. 12 is a schematic diagram illustrating an example in which a shaft connection member of another example embodiment.

In the present disclosure, to generate a difference in rotational speeds between the inner container 210 and the dewatering container 510, the dewatering unit 500 may include a dewatering container speed change device along with the dewatering container 510 described above, as illustrated in FIGS. 11 and 12 as another example embodiment.

In this case, the dewatering container speed change device may include a dewatering container driving unit 530 for driving and rotating the dewatering container 510.

The dewatering container driving unit 530 may include a dewatering container rotating shaft 531 and a dewatering container driving motor M3.

Here, the dewatering container rotating shaft 531 may be vertically connected to the lower portion of the dewatering container 510, and the dewatering container driving motor M3 may be connected to the dewatering container rotating shaft 531.

That is, the dewatering container rotating shaft 531 may be connected to the lower portion of the dewatering container 510 and may extend in the longitudinal direction, and by connecting the dewatering container 510 to the dewatering container driving motor M3 and transferring the rotational driving force of the dewatering container driving motor M3 to the dewatering container 510, the dewatering container 510 may be driven to rotate when the dewatering container driving motor M3 operates.

In this case, the dewatering container rotating shaft 531 and the dewatering container driving motor M3 may be connected to each other via a third timing belt T3.

Accordingly, the rotational speed and rotation direction of the inner container 210 may change by the inner container driving unit 220, and the rotational speed and rotation direction of the dewatering container 510 may change by the dewatering container driving unit 530, and accordingly, there may be a difference in rotational speeds between the inner container 210 and the dewatering container 510.

For reference, the inner container driving unit 220 and the dewatering container driving unit 530 may be controlled by a controller electrically connected.

Further, in the present disclosure in which the above-described dewatering container driving unit 530 is provided, the blade rotating shaft 131 may be disposed within the hollow of the inner container rotating shaft 221, and the inner container rotating shaft 221 may be disposed within the hollow of the dewatering container rotating shaft 531, such that the blade rotating shaft 131, the inner container rotating shaft 221, and the dewatering container rotating shaft 531 may rotate independently of each other.

Specifically, a first bearing B1 may be installed between the blade rotating shaft 131 and the inner container rotating shaft 221, and a second bearing B2 may be installed between the inner container rotating shaft 221 and the dewatering container rotating shaft 531.

Also, a third bearing B3 may be installed between the lower extension portion 113 extending from the lower portion of the outer container 110 and formed around the inner container rotating shaft 221 and the dewatering container rotating shaft 531.

In this case, the second bearing B2 may be a one-way bearing, and the second bearing B2 may, when the mixing object rotates at high speed by the high-speed rotation of the blade rotating shaft 131, prevent the inner container 210, which may have to rotate in the opposite direction of the blade rotating shaft 131, from rotating in the same direction as the blade rotating shaft 131 by the mixing object rotating at high speed.

The open upper portion of the outer container 110 may be opened and closed by the outer container cover 110a, the open upper portion of the dewatering container 510 may be opened and closed by the dewatering container cover 511, and the open upper portion of the inner container 210 may be opened and closed by the inner container cover 210.

Here, an outer container cover groove 110b may be formed on the lower surface of the outer container cover 110a, and a dewatering container cover projection 511a configured to be inserted into the outer container cover groove 110b and to be rotatable may be formed on the upper surface of the dewatering container cover 511.

In this case, a dewatering container cover groove 511a may be formed on the lower surface of the dewatering container cover 511, and an inner container cover projection 230a configured to be inserted into the dewatering container cover groove 511a and to be rotatable may be formed on the upper surface of the inner container cover 210.

By the structure of the covers described above, the inner container 210 and the dewatering container 510 may rotate stably without shaking.

Meanwhile, to generate a difference in rotational speeds between the inner container 210 and the dewatering container 510, the dewatering unit 500 may include a dewatering container driving unit 530 along with the dewatering container 510 described above, as illustrated in FIG. 6 as an example embodiment.

The lower portion of the dewatering container 510 may be rotatably installed the outer container 110, and the upper portion may be connected to the dewatering container driving portion 530 such that the rotational driving force of the dewatering container driving portion 530 may be provided to the upper portion of the dewatering container 510.

That is, as the dewatering container 510 is provided with a rotational driving force of the dewatering container driving unit 530 through the upper portion such that the upper portion may rotate by the dewatering container driving unit 530, and in this case, the lower portion of the dewatering container 510 may be rotatably installed in a bearing structure in the outer container 110 such that the lower portion of the dewatering container 510 may rotate together when the upper portion rotates.

The structure in which the rotational driving force of the dewatering container driving unit 530 is provided through the upper portion of the dewatering container 510 will be described as below.

The dewatering container cover 511 of the dewatering unit 500 may be configured to cover the dewatering container 510 and may be key-coupled to the dewatering container 510.

Here, the dewatering container driving unit 530 may be connected to the dewatering container cover 511 and may rotate the dewatering container cover 511, thereby rotating the dewatering container 510 in an interlocked manner.

The dewatering container driving unit 530 may include a dewatering container driving motor M3 and a dewatering container rotating shaft 531.

The dewatering container driving motor M3 may be installed in the mixer body 100, and the dewatering container rotating shaft 531 key-coupled to the dewatering container cover 511, thereby rotating the dewatering container cover 511 in an interlocked manner when rotating.

The dewatering container driving unit 530 may further include a shaft connection member 532, the shaft connection member 532 may connect the motor shaft of the dewatering container driving motor M3 to the dewatering container rotating shaft 531 and may transfer rotational driving force from the motor shaft to the dewatering container rotating shaft 531.

The shaft connection member 532 may be configured as at least one of a gear connection shaft and a connection belt. In this case, at least one or more of each of the gear connection shaft and the connecting belt may be arranged.

As an example, the shaft connection member 532 may include a first gear connection shaft 532a having a left end gear-connected to the upper end of the dewatering trough rotating shaft 531, and a second gear connection shaft 532b having an upper end gear-connected to a right end of the first gear connection shaft 532a and a lower end gear-connected to the motor shaft of the dewatering container driving motor M3.

In this case, a bevel gear for the gear connection structure may be formed on each of the upper end of the dewatering container rotating shaft 531, the left end and right end of the first gear connection shaft 532a, and the upper end and the lower end of the second gear connection shaft 532b.

As another example embodiment, as the shaft connecting member 532, the first connecting belt 532a', an intermediate connection shaft 532b', and a second connecting belt 532c' illustrated in FIG. 12 may be used, instead of the first gear connection shaft 532a and the second gear connection shaft 532b illustrated in FIG. 11. Here, a timing gear may be formed on the upper ends of the dewatering container rotating shaft 531 and the dewatering container driving motor M3 and the upper and lower ends of the intermediate connection shaft 532b' to transfer driving force while the first connecting belt 532a' and the second connecting belt 532c' rotate while being wound, and in this case, a timing belt may be used for the first connecting belt 532a' and the second connecting belt 532c'. For reference, the elements having the same reference numerals as those in FIG. 7 in FIG. 6 may have the same functions and structures, and thus, the descriptions thereof will not be provided.

Meanwhile, the outer container 110 of the mixer body 100 may be opened and closed by the outer container cover 110a, and the dewatering container rotating shaft 531 may penetrate the outer container cover 110a, and may rotate separately from the outer container cover 110a.

In this case, the lower centers of the inner container 210, the dewatering container 510 and the outer container 110 may be penetrated by the blade rotating shaft 131 of the blade driving unit 130, and may be connected to the blade rotating shaft 131 by a bearing.

Further, the dewatering container driving motor M3 may be disposed on the upper side or lower side, or on the side of the dewatering container 510.

Specifically, the dewatering container driving motor M3 may have a structure of being connected to the dewatering container rotating shaft 531 or the shaft connection member 532, and although not illustrated in the drawings, as an example, the dewatering container driving motor M3 may be embedded in the mixer cover 140 disposed on the upper side of the dewatering container 510, and as another example, the dewatering container driving motor M3 may be embedded in the side casing portion 320 of the container support case 300 disposed on the side of the dewatering container 510. Further, as another example, as illustrated in the drawing, the dewatering container driving motor M3 may be embedded in the lower casing portion 310 of the container support case 300 disposed on the lower side of the dewatering container 510.

Accordingly, in the mixer according to the present disclosure, the rotational driving force may be configured to be provided from the upper portion to each of the inner container 210 and the dewatering container 510, such that the inner container 210 and the dewatering container 510 may rotate safely and smoothly, independently of the pulverizing blade 120, thereby improving the pulverizing performance of the mixing object.

FIG. 13 is a flowchart illustrating a dewatering method of a mixer according to an example embodiment.

The dewatering method of the mixer according to the present disclosure will be described with reference to FIG. 13.

The dewatering method of the mixer according to the present disclosure may include a step of dewatering (S100) and a step of generating a speed difference (S200), and the step of dewatering (S100) may be performed before and after the step of generating a speed difference (S200).

That is, the pattern in which the step of dewatering S (100), the step of generating a speed difference (S200), and the step of dewatering (S100) are performed in order may be formed, and the pattern may be performed once or more.

In other words, the step of dewatering (S100) may be performed before the step of generating a speed difference (S200), and may be performed again after the step of generating a speed difference (S200), and this pattern may be repeated at least once.

Here, the step of dewatering (S100) may be a step in which the inner container 210 (in FIG. 5) and the dewatering container 510 (in FIG. 5) rotate in the same direction.

That is, in the step of dewatering (S100), the inner container 210 in which the mixing object is accommodated and the lateral opening is formed to dewater the mixing object, and the dewatering container 510 surrounding the side portion of the inner container 210 may rotate in the same direction.

Specifically, in the mixer according to an example embodiment of the present disclosure illustrated in FIG. 6, as the mixing object rotates as the inner container 210 rotates by the inner container driving unit 220, due to the friction between the rotating mixing object and the dewatering container 510 through the lateral opening 210a of the inner container 210, the dewatering container 510 may also rotate together with the inner container 210.

Also, in the mixer according to another example embodiment of the present disclosure illustrated in FIGS. 7, 11, and 12, the inner container 210 may rotate by the inner container driving unit 220, and the dewatering container 510 may rotate in the n the same direction as the inner container 210 by the dewatering container driving unit 530, such that the inner container 210 and the dewatering container 510 may rotate together in the same direction.

As described above, by the step of dewatering (S100), the inner container 210 and the dewatering container 510 may rotate in the same direction, such that the mixing object may be pressed against the dewatering container 510 through the lateral opening 210a of the inner container 210 by the centrifugal force and the juice may be created, and the juice may pass through the dewatering hole 510a, and accordingly, the mixing object is dewatered.

Further, the step of dewatering (S100) may be performed only when the discharge tube 112 of the outer container 110 in which the dewatering container 510 is accommodated is opened, that is, the step of dewatering (S100) may be performed only under the condition in which the juice passing through the dewatering hole 510a of the dewatering container 510 is discharged to the outside through the discharge tube 112 of the outer container 110.

Thereafter, the step of generating a speed difference (S200) may be a step of generating a difference in rotational speeds between the inner container 210 and the dewatering container 510.

Specifically, the step of generating a speed difference (S200) may be a step of generating a difference in rotational speeds between the inner container having the scraper 214 formed on the outer side thereof and the dewatering container 510 such that the blocking component of the mixing object blocking the dewatering hole 510a of the dewatering container 510 may be scraped off.

This step of generating a speed difference (S200) may be implemented by various methods as below.

As an example method, the step of generating a speed difference (S200) may be implemented by stopping the dewatering container 510 while the inner container 210 rotates.

Specifically, in the mixer according to an example embodiment of the present disclosure illustrated in FIG. 6, the inner container 210 may rotate by the inner container driving unit 220, such that, while the inner container 210 rotates, the dewatering container speed limiting unit 520 may stop the dewatering container 510 rotating together, and accordingly, there may be a difference in speeds between the inner container 210 and the dewatering container 510. That is, the stop pin 521 of the dewatering container speed limiting unit 520 is inserted into the stop groove 510b of the dewatering container 510, such that the rotating dewatering container 510 may be stopped.

Also, in the mixer according to another example embodiment of the present disclosure illustrated in FIGS. 7, 11, and 12, the inner container 210 may rotate by the inner container driving unit 220, and while the inner container 210 rotates, the dewatering container driving unit 530 may stop the rotating dewatering container 510, and accordingly, there may be a difference in speeds between the inner container 210 and the dewatering container 510. That is, the dewatering container driving unit 530 may be controlled by the controller to stop the dewatering container 510.

As another example method, the step of generating a speed difference (S200) may be implemented by decelerating the dewatering container 510 more than the inner container 210.

Specifically, in the mixer according to an example embodiment of the present disclosure illustrated in FIG. 6, the inner container 210 may rotate by the inner container driving unit 220, and while the inner container 210 rotates, the dewatering container 510 rotating together may be decelerated by the dewatering container speed limiting unit 520, such that there may be a difference in speeds between the inner container 210 and the dewatering container 510.

That is, although not illustrated in the drawings, the friction block of the dewatering container speed limiting unit 520 may be in contact with the lower portion of the dewatering container 510, thereby decelerating the rotating dewatering container 510.

Also, in the mixer according to another example embodiment of the present disclosure illustrated in FIGS. 7, 11, and 12, the inner container 210 may rotate by the inner container driving unit 220, and while the inner container 210 rotates, the rotating dewatering container 510 may be decelerated by the dewatering container driving unit 520, such that there may be a difference in speeds between the inner container 210 and the dewatering container 510. That is, the dewatering container driving unit 530 may be controlled by the controller to decelerate the dewatering container 510.

As another example method, the step of generating a speed difference (S200) may be implemented by stopping the inner container 210 while the dewatering container 510 rotates.

Specifically, in the mixer according to another example embodiment of the present disclosure illustrated in FIGS. 7, 11, and 12, the inner container 210 may rotate by the inner container driving unit 220, and while the inner container 210 rotates, the inner container driving unit 220 may stop the rotating inner container 210, such that there may be a difference in speeds between the inner container 210 and the dewatering container 510. That is, the inner container driving unit 220 may be controlled by the controller to stop the inner container 210.

As another example method, the step of generating a speed difference (S200) may be implemented by decelerating the inner container 210 than the dewatering container 510.

Specifically, in the mixer according to another example embodiment of the present disclosure illustrated in FIGS. 7, 11, and 12, the inner container 210 may rotate by the inner container driving unit 220, and while the inner container 210 rotates, the inner container 210 may be decelerated by the inner container driving unit 220, such that there may be a difference in speeds between the inner container 210 and the dewatering container 510. That is, the inner container driving unit 220 may be controlled by the controller to decelerate the inner container 210.

As another example method, the step of generating a speed difference (S200) may be implemented by rotating the inner container 210 and the dewatering container 510 in opposite directions.

Specifically, in the mixer according to another example embodiment of the present disclosure illustrated in FIGS. 7, 11, and 12, the dewatering container driving unit 530 may rotate the dewatering container 510 in the opposite direction to the inner container 210, or the inner container driving unit 220 may rotate the inner container 210 in the opposite direction to the dewatering container 510, such that there may be a difference in speeds between the inner container 210 and the dewatering container 510. That is, the inner container driving unit 220 or the dewatering container driving unit 530 may be controlled by the controller such that the inner container 210 and the dewatering container 510 may rotate in opposite directions.

Accordingly, in the present disclosure, the scraper 214 may be formed on the outer side surface of the inner container 210 and a difference in the rotational speeds between the inner container 210 and the dewatering container 510 may be generated, such that the blocking component of the mixing object blocking the dewatering hole 510a of the dewatering container 510 may be scraped off, such that efficiency of dewatering the mixing object may increase.

While the example embodiments have been illustrated and described above, it will be apparent to those skilled in the art that modifications and variations could be made without departing from the scope in the example embodiment as defined by the appended claims.

The invention claimed is:

1. A mixer, comprising:
a mixer body including an outer container, a pulverizing blade and a blade driving unit configured to rotate the pulverizing blade;
an inner container unit including an inner container disposed within the outer container, provided with the pulverizing blade, and having a lateral opening formed therein, and an inner container driving unit configured to rotate the inner container; and
a dewatering unit including a dewatering container configured to block the lateral opening by surrounding the inner container so as to accommodate the mixing object therein and to have a dewatering hole therein, and a dewatering container speed change device configured to change a rotational speed of the dewatering container,
wherein a scraper protrudes from an outer side surface of the inner container to scrape off a blocking component of the mixing object blocking the dewatering hole of the dewatering container.

2. The mixer of claim 1,
wherein a plurality of stop grooves are formed along a lower edge of the dewatering container,
wherein the dewatering container speed change device includes a dewatering container speed limiting unit configured to limit a rotational speed of the dewatering container, and
wherein the dewatering container speed limiting unit includes:
a stop pin configured to rise toward the stop groove side of the dewatering container and to stop rotation of the dewatering container by being drawn and caught into the stop groove; and
a pin driving member configured to lift the stop pin.

3. The mixer of claim 2,
wherein, in the outer container, a stop hole through which the stop pin is lifted is formed in a lower portion, and a pin accommodation bracket is formed to accommodate the stop pin on a lower side of the stop hole in the lower portion, and
wherein the dewatering container speed limiting unit further includes an elastic member disposed between a head of the stop pin and a lower surface of the outer container, and configured to, when lifting pressure of the pin driving member with respect to the stop pin is released, provide elastic force to move down the stop pin while the stop pin is maintained to block the stop hole.

4. The mixer of claim 2, wherein the dewatering unit includes a dewatering support rail disposed within the outer container, and having a lower rim of the dewatering container seated therein and supporting the dewatering container to slide and rotate.

5. The mixer of claim 1, wherein the dewatering container speed limiting unit includes:
a friction pad configured to rise toward a lower side of the dewatering container and to reduce a rotational speed of the dewatering container when in contact with a lower portion of the dewatering container; and
a pad driving member connected to the friction pad and configured to lift the friction pad.

6. The mixer of claim 1, wherein the scraper is formed on an outer side surface of the inner container in a longitudinal direction, and protrudes to an inner side surface of the dewatering container.

7. The mixer of claim 6, wherein a plurality of the lateral openings are formed on a side portion of the inner container in a transverse direction, and a plurality of the scraper are disposed between the plurality of lateral openings.

8. The mixer of claim 1, wherein the inner container has a liquid accommodation projection formed on a lower side of a side portion thereof.

9. The mixer of claim 1,
wherein a protrusion is formed on an inner side surface of the inner container such that the mixing object rotating while being pulverized by the pulverizing blade is caught into the protrusion, and
wherein the protrusion has a screw protrusion line shape to, when the pulverizing blade and the inner container rotate in opposite directions, guide a downward spiral flow of the mixing object such that the mixing object flows downwardly while rotating in an opposite direction to a direction of rotation of the pulverizing blade.

10. The mixer of claim 1,
wherein the blade driving unit includes a blade rotating shaft connected to a lower portion of the pulverizing blade; and a blade driving motor connected to the blade rotating shaft to rotate the blade rotating shaft,
wherein the inner container driving unit includes an inner container rotating shaft connected to a lower portion of the inner container; and an inner container driving motor connected to the inner container rotating shaft to rotate the inner container rotating shaft, and
wherein the blade rotating shaft is disposed within a hollow of the inner container rotating shaft, and the blade rotating shaft and the inner container rotating shaft rotate independently of each other.

11. The mixer of claim 10,
wherein a first bearing is installed between the blade rotating shaft and the inner container rotating shaft, and a second bearing is installed between a lower extension portion extending from the lower portion of the outer container and formed around the inner container rotating shaft and the inner container rotating shaft, and
wherein the second bearing is a one-way bearing.

12. The mixer of claim 1,
wherein an open upper portion of the outer container is opened and closed by an outer container cover, an open upper portion of the dewatering container is opened and closed by a dewatering container cover, and an open upper portion of the inner container is opened and closed by an inner container cover,
wherein an outer container cover groove is formed on a lower surface of the outer container cover, and a dewatering container cover protrusion inserted into the outer container cover groove and configured to be rotatable is formed on an upper surface of the dewatering container cover, and
wherein a dewatering container cover groove is formed on the lower surface of the dewatering container cover, and an inner container cover projection inserted into the dewatering container cover groove and configured to be rotatable is formed on an upper surface of the inner container.

13. The mixer of claim 1,
wherein the blade driving unit includes a blade rotating shaft connected to a lower portion of the pulverizing blade, and a blade driving member connected to the blade rotating shaft to rotate the blade rotating shaft,
wherein the inner container driving unit includes an inner container rotating shaft connected to a lower portion of the inner container, and an inner container driving member connected to the inner container rotating shaft to rotate the inner container rotating shaft,
wherein the dewatering container speed change device includes a dewatering container driving portion configured to drive and rotate the dewatering container, and
wherein the dewatering container driving unit includes a dewatering container rotating shaft connected to a lower portion of the dewatering container, and a dewatering container driving member connected to the dewatering container rotating shaft to rotate the dewatering container rotating shaft.

14. The mixer of claim 13, wherein the blade rotating shaft is disposed within a hollow of the inner container rotating shaft, and the inner container rotating shaft is disposed within a hollow of the dewatering container rotating shaft, such that the blade rotating shaft, the inner container rotating shaft, and the dewatering container rotating shaft rotate independently of each other.

15. The mixer of claim 14,
wherein a first bearing is installed between the blade rotating shaft and the inner container rotating shaft, and a second bearing is installed between the inner container rotating shaft and the dewatering container rotating shaft,
wherein a third bearing is installed between a lower extension portion extending from a lower portion of the outer container and formed around the dewatering container rotating shaft and the dewatering container rotating shaft, and
wherein the second bearing is a one-way bearing.

16. A dewatering method of a mixer, the method comprising:
a step of dewatering including rotating, in the same direction, an inner container in which a mixing object is accommodated and a lateral opening is formed, and a dewatering container surrounding a side portion of the inner container and including a dewatering hole therein; and
a step of generating a speed difference including generating a difference in rotational speeds between the inner container having a scraper formed on an outer side surface thereof to scrape off a blocking component of the mixing object blocking the dewatering hole of the dewatering container, and the dewatering container.

17. The method of claim 16, wherein the step of generating a speed difference includes stopping the dewatering container while the inner container rotates.

18. The method of claim 16, wherein the step of generating a speed difference includes reducing a speed of the dewatering container further than a speed of the inner container.

19. The method of claim 16, wherein the step of generating a speed difference includes stopping the inner container while the dewatering container rotates.

20. The method of claim 16, wherein the step of generating a speed difference includes reducing a speed of the inner container further than a speed of the dewatering container.

21. The method of claim 16, wherein the step of generating a speed difference includes rotating the inner container and the dewatering container in opposite directions.

22. The method of claim 16, wherein a pattern in which the step of dewatering, the step of generating a speed difference, and the step of dewatering are performed in order is formed, and the pattern is performed at least once or more.

23. The method of claim 16, wherein the step of dewatering is performed only when a discharge tube of an outer container in which the dewatering container is accommodated is open.

* * * * *